(12) United States Patent
Zheng et al.

(10) Patent No.: US 11,739,015 B2
(45) Date of Patent: Aug. 29, 2023

(54) LOW-CARBON NITROGEN AND PHOSPHORUS REMOVAL SYSTEM AND PROCESS FOR SEWAGE TREATMENT

(71) Applicant: North China Municipal Engineering Design & Research Institute Co., Ltd., Tianjin (CN)

(72) Inventors: Xingcan Zheng, Tianjin (CN); Qiongqiong Xia, Tianjin (CN); Pengfeng Li, Tianjin (CN); Yongli Sun, Tianjin (CN); Wei Shang, Tianjin (CN); Wenan Zhang, Tianjin (CN); Yaxiong Wang, Tianjin (CN)

(73) Assignee: NORTH CHINA MUNICIPAL ENGINEERING DESIGN & RESEARCH INSTITUTE CO., LTD., Tianjin (CN)

( * ) Notice: Subject to any disclaimer, the term of this patent is extended or adjusted under 35 U.S.C. 154(b) by 0 days.

(21) Appl. No.: 18/177,223

(22) Filed: Mar. 2, 2023

(65) Prior Publication Data

US 2023/0202893 A1    Jun. 29, 2023

(30) Foreign Application Priority Data

Jul. 27, 2022    (CN) .......................... 202210888524.3

(51) Int. Cl.
*C02F 3/30*    (2023.01)
*C02F 103/00*   (2006.01)
(Continued)

(52) U.S. Cl.
CPC ........ *C02F 3/308* (2013.01); *C02F 2101/105* (2013.01); *C02F 2101/16* (2013.01);
(Continued)

(58) Field of Classification Search
CPC ................ C02F 3/308; C02F 2101/105; C02F 2101/16; C02F 2103/005; C02F 2203/006;
(Continued)

(56) References Cited

U.S. PATENT DOCUMENTS

2015/0353397 A1* 12/2015 Cath ..................... C02F 3/1268
                                                         210/253
2021/0363043 A1* 11/2021 Rhu ......................... C02F 9/00

FOREIGN PATENT DOCUMENTS

CN    110255714 A    9/2019
CN    113003881 A    6/2021
(Continued)

OTHER PUBLICATIONS

Machine-generated English translation of KR 102099380, generated on Apr. 24, 2023.*

*Primary Examiner* — Fred Prince
(74) *Attorney, Agent, or Firm* — IPRO, PLLC

(57) ABSTRACT

The disclosure belongs to the field of sewage treatment technology, in particular to a low-carbon nitrogen and phosphorus removal system and process for sewage treatment. The system of the disclosure includes a primary sedimentation fermentation tank, a mainstream modified $A^2O$ unit and a bypass anammox unit. The disclosure sets a denitrification phosphorus removal functional zone in the anoxic tank of the $A^2O$ system, and sets a deoxygenation zone in the aerobic tank. Combined with the primary sedimentation fermentation tank, the efficient utilization of the carbon source of the $A^2O$ process is strengthened. The system has good effluent quality and does not require the addition of a carbon source, and the aeration energy consumption is low, which achieves efficient and low-carbon nitrogen and phosphorus removal.

7 Claims, 1 Drawing Sheet

(51) Int. Cl.
*C02F 101/10* (2006.01)
*C02F 101/16* (2006.01)

(52) U.S. Cl.
CPC .. *C02F 2103/005* (2013.01); *C02F 2203/006* (2013.01); *C02F 2209/225* (2013.01); *C02F 2209/42* (2013.01); *C02F 2209/44* (2013.01)

(58) Field of Classification Search
CPC ............ C02F 2209/225; C02F 2209/42; C02F 2209/44
USPC ....... 210/605, 615, 616, 617, 252, 259, 903, 210/906, 908
See application file for complete search history.

(56) References Cited

FOREIGN PATENT DOCUMENTS

| | | |
|---|---|---|
| CN | 114702137 A | 7/2022 |
| KR | 102099380 B1 * | 4/2020 |

* cited by examiner

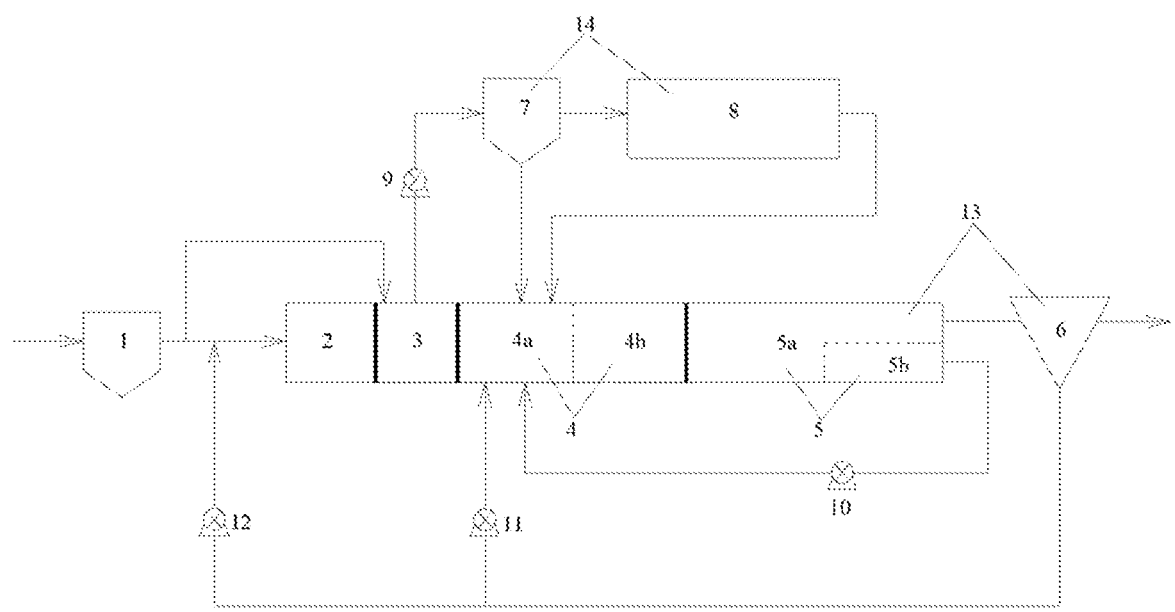

LOW-CARBON NITROGEN AND PHOSPHORUS REMOVAL SYSTEM AND PROCESS FOR SEWAGE TREATMENT

TECHNICAL FIELD

The disclosure belongs to the field of sewage treatment technology, in particular to a low-carbon nitrogen and phosphorus removal system and process for sewage treatment.

BACKGROUND

At present, the traditional $A^2O$ process commonly used in domestic sewage treatment has certain requirements for the carbon-nitrogen ratio (C/N) and carbon-phosphorus ratio (C/P) and the like in sewage. When the concentration of organic matter in the influent is low, additional external carbon sources are usually required. In addition, the removal of organic matter and nitrification process require high aeration energy consumption. To solve the problem of insufficient carbon source, it is an effective way to optimize the existing $A^2O$ process and realize the efficient utilization of carbon source. In addition, the use of low-carbon, efficient and sustainable new process is also becoming a popular solution. The birth of new autotrophic nitrogen and phosphorus removal process such as anammox (anaerobic ammonia oxidation) provides a new theory and ideas for the design of the treatment process.

Anammoxis a process of oxidizing ammonia to nitrogen by anaerobic ammonia oxidizing bacteria with $NH_4^+$ as electron donor, $NO_2^-$ as electron acceptor and $CO_2$ or $HCO_3^-$ as carbon source under anaerobic condition. Compared with the traditional nitrogen and phosphorus removal process, anammoxprocess does not need to add organic carbon source, aeration energy consumption can be saved by about 60%, and sludge production is small.

At present, the use of anammoxtechnology to treat high ammonia nitrogen wastewater has been relatively mature, but the treatment of domestic sewage by itis still difficult. The main reason is that the influent nitrogen concentration is low, and NOB (nitrite oxidizing bacteria) inhibition condition does not exist. In addition, when the concentration of effluent ammonia nitrogen is low, the growth rate of AOB (ammonia oxidizing bacteria) is lower than that of NOB. In order to ensure the stable operation of the system, the effluent ammonia nitrogen of anammox is usually kept at 5 mg/L or more. Therefore, further treatment should be carried out to obtain better effluent water quality.

Overall, due to the bottleneck, the problem of the use of anammox technology to treat domestic sewage has not been solved, and the use of anammox process alone cannot complete the removal of phosphorus, so at the application level, it is difficult to form a significant competitive advantage compared with the traditional $A^2O$ process. With the rapid development of the coupling process, on the basis of strengthening the efficient utilization of carbon sources in the traditional $A^2O$ process, the combination of anammox technology and traditional $A^2O$ process, giving full play to their advantages and overcoming their own defects has become one of the main directions to realize the application of anammox in the field of domestic sewage treatment.

In the process coupling, due to the different influent carbon and nitrogen ratios required for anammox and $A^2O$ process, how to meet the respective influent water quality is a difficulty to be concerned. In addition, the sludge reflux liquid in the $A^2O$ process further dilutes the influent nitrogen concentration, which is more unfavorable to the stable operation of the anammox process. How to avoid the interaction of the two process systems and realize the effective retention and growth of their respective functional microorganisms is also an important issue to be considered.

SUMMARY

The disclosure aims to overcome the shortcomings of the prior art and provides a low-carbon nitrogen and phosphorus removal system and process for sewage treatment. The disclosure sets a denitrifyingphosphorus removal zone in the anoxic tank and sets a deoxygenation zone in the aerobic tank in a modified $A^2O$ unit. Combined with the primary sedimentation fermentation tank, the efficient utilization of the carbon source of the modified $A^2O$ process is strengthened. On this basis, by setting the bypass anammox tank, the carbon source separation sedimentation tank and the double sludge reflux system, the technical difficulty of coupling between anammox technology and $A^2O$ process is solved, and the operation of both the mainstream modified $A^2O$ unit and the bypass anammox unit is stable and efficient. As a whole, the effluent water quality of the process system is good, there is no external carbon source, and the aeration energy consumption is low, the system has the characteristics of high efficiency and low carbon.

To achieve the above technical purposes, the technical solution adopted by the example of the disclosure is:

In first aspect, the example of the disclosure provides a low-carbon nitrogen and phosphorus removal system for sewage treatment, including a primary sedimentation fermentation tank, a mainstream modified $A^2O$ unit and a bypass anammox unit;

the mainstream modified $A^2O$ unit includes a pre-anoxic tank, an anaerobic tank, an anoxic tank, an aerobic tank and a secondary sedimentation tank;

the water outlet of the primary sedimentation fermentation tank is simultaneously connected with both the inlet end of the pre-anoxic tank and the anaerobic tank, the outlet end of the pre-anoxic tank is connected with the inlet end of the anaerobic tank, the outlet end of the anaerobic tank is connected with the inlet end of the anoxic tank, the outlet end of the anoxic tank is connected with the aerobic tank, the outlet end of the aerobic tank is simultaneously connected with both the inlet end of the secondary sedimentation tank and the inlet end of an internal reflux pump, the outlet end of the internal reflux pump is connected with the inlet end of the anoxic tank, the bottom sludge outlet of the secondary sedimentation tank is simultaneously connected with the inlet end of both a first sludge reflux pump and a second sludge reflux pump, the outlet end of the first sludge reflux pump is connected with the inlet end of the anoxic tank, and the outlet end of the second sludge reflux pump is connected with the inlet end of the pre-anoxic tank;

the bypass anammox unit includes a carbon source separation sedimentation tank and an anammox tank, the inlet end of the carbon source separation sedimentation tank is connected with the outlet end of a water inlet pump, the outlet end of the carbon source separation sedimentation tank is connected with the inlet end of the anammox tank, the outlet end of the anammox tank is connected with the inlet end of the anoxic tank, the bottom sludge outlet of the carbon source separation sedimentation tank is connected with the inlet end of the anoxic tank, and the inlet end of the water inlet pump is connected with the outlet end of the anaerobic tank.

Further, the anoxic tank includes a denitrification phosphorus removal zone and a denitrification nitrogen removal zone, the inlet end of the denitrification phosphorus removal zone is simultaneously connected with the outlet end of the anaerobic tank, the bottom sludge outlet of the carbon source separation sedimentation tank, the outlet end of the anammox tank, the outlet end of the internal reflux pump and the outlet end of the first sludge reflux pump, the outlet end of the denitrification phosphorus removal zone is connected with the inlet end of the denitrification nitrogen removal zone, and the outlet end of the denitrification nitrogen removal zone is connected with the inlet end of the aerobic tank.

Further, the aerobic tank includes an aerobic zone and a deoxygenation zone, the inlet end of the aerobic zone is connected with the outlet end of the denitrification nitrogen removal zone, the outlet end of the aerobic zone is simultaneously connected with the inlet end of the deoxygenation zone and the secondary sedimentation tank, and the outlet end of the deoxygenation zone is connected with the inlet end of the internal reflux pump.

In second aspect, the example of the disclosure provides a low-carbon nitrogen and phosphorus removal process for sewage treatment, and the process includes the following steps:

step 1: making the pretreated domestic sewage enter the primary sedimentation fermentation tank for primary sedimentation and fermentation to provide carbon source for subsequent nitrogen and phosphorus removal;

step S2: making one part of the effluent of the primary sedimentation fermentation tank and one part of the reflux sludge of the secondary sedimentation tank enter the pre-anoxic tank for denitrification;

step S3: making the other part of the effluent of the primary sedimentation fermentation tank and the effluent of the pre-anoxic tank enter the anaerobic tank for biological phosphorus release;

step S4: making one part of the effluent of the anaerobic tank enter the carbon source separation sedimentation tank for sludge water separation;

step S5: making the supernatant of the carbon source separation sedimentation tank enter the anammox tank to complete the autotrophic nitrogen removal;

step S6: making the sludge discharged from the bottom of the carbon source separation sedimentation tank, the internal reflux liquid from the internal reflux pump, the reflux sludge from the first sludge reflux pump, the effluent of the anammox tank and the other part of the effluent of the anaerobic tank simultaneously enter the denitrification phosphorus removal zone of the anoxic tank for denitrification phosphorus absorption;

step S7: making the effluent of the denitrification phosphorus removal zone successively enter the denitrification nitrogen removal zone of the anoxic tank and the aerobic zone of the aerobic tank to complete nitrogen removal, aerobic phosphorus absorption and nitrification;

step S8: making one part of the effluent of the aerobic zone enter the deoxygenation zone of the aerobic tank, and making the effluent of the deoxygenation zone enter the denitrification phosphorus removal zone through the internal reflux pump;

step S9: after making the other part of the effluent of the aerobic zone enter the secondary sedimentation tank to complete the sludge water separation, discharging the clear liquid from the outlet end of the secondary sedimentation tank; and step S10: making one part of the bottom sludge of the secondary sedimentation tank enter the denitrification phosphorus removal zone through the first sludge reflux pump, and making the other part of the bottom sludge of the secondary sedimentation tank enter the pre-anoxic tank through the second sludge reflux pump.

Further, the solid retention time in the primary sedimentation fermentation tank is 1-5 d, and the hydraulic retention time is 0.5-1.0 h; and the surface loading is 2.0-2.5 $m^3/(m^2 \cdot h)$, the sludge blanket height in the primary sedimentation fermentation tank is 60%-80% of the effective water depth, and the stirring power does not exceed 0.5 $W/m^3$.

Further, the hydraulic retention time in the carbon source separation sedimentation tank is 1-2 h.

Further, the hydraulic retention time in the deoxygenation zone is 0.5-1.0 h, with a stirrer or propeller inside, and the terminal DO is controlled at 0.5 mg/L or less.

Further, the anammox tank is an integrated anammox system, which completes the nitrification and anammox processes in the same tank.

Further, the hydraulic retention time in the anammox tank is 2-6 h, when the activated sludge process is used, the solid retention time is 4-6 d, and the DO is 0.5 mg/L or less, when the pure membrane MBBR (moving bed biofilm reactor) process is used, the filler filling ratio is 30%-50%, and the DO is 0.5-2.5 mg/L.

The beneficial effects of the technical solution provided by the example of the disclosure are as follow:

(1) The disclosure combines autotrophic nitrogen removal and $A^2O$ process by setting a bypass anammox unit, which overcomes the shortcomings of high energy and high chemicals consumption in nitrogen and phosphorus removal compared to traditional process, and avoids the disadvantages of using anammox alone, which makes it difficult to obtain very low concentrations of ammonia in the effluent and does not remove phosphorus. It not only achieve a good effluent water quality, but also realize an efficient and low-carbon nitrogen and phosphorus removal.

(2) A denitrification phosphorus removal zone is set in the anoxic tank of $A^2O$ system. Through the metabolism of denitrification phosphorus removal bacteria, the process of excessive phosphorus absorption and denitrification is completed at the same time, the organic carbon substrate is used simultaneously for the removal of both nitrogen and phosphorus. By introducing the technology of primary sedimentation fermentation, denitrification phosphorus removal and anammox, the system as a whole does not require the addition of a carbon source, resulting in significant savings in operating costs.

(3) Through the control of sludge retention time, mechanical stirring and high sludge blanket, the primary sedimentation fermentation tank strengthens the hydraulic shear effect, strips the organic matter wrapped in the outer layer of suspended particles and hydrolyzes the organics at the same time, which increases the utilization efficiency of carbon source.

(4) By setting the carbon source separation sedimentation tank, the phosphorus release liquid is subjected to sludge water separation, which not only provides a low organic concentration influent for anammox process, but also provides an intracellular carbon source for denitrification phosphorus removal in the anoxic tank, facilitating the efficient operation of anammox and denitrification phosphorus removal.

(5) The double sludge reflux system is adopted to avoid the reflux of all sludge to the pre-anoxic tank, resulting in a large degree of dilution of the influent of the anammox tank, which is conducive to the inhibition of NOB, thereby achieving stable operation of anammox.

(6) The mixed liquid in the A²O aerobic tank is split into the deoxygenation zone and the aerobic zone respectively. Without affecting the actual operation function of the aerobic zone, the dissolved oxygen (DO) in the internal reflux liquid is controlled to avoid the inhibition of DO on denitrification process after refluxing to the anoxic tank.

BRIEF DESCRIPTION OF FIGURES

FIG. 1 is the process flow diagram of the example of the disclosure.

Description of reference numerals: 1—primary sedimentation fermentation tank; 2—pre-anoxic tank; 3—anaerobic tank; 4—anoxic tank; 4a—denitrification phosphorus removal zone; 4b—denitrification nitrogen removal zone; 5—aerobic tank; 5a—aerobic zone; 5b—deoxygenation zone; 6—secondary sedimentation tank; 7—carbon source separation sedimentation tank; 8—anammox tank; 9—water inlet pump; 10—internal reflux pump; 11—first sludge reflux pump; 12—second sludge reflux pump; 13—mainstream modified A²O unit; and 14—bypass anammox unit.

DETAILED DESCRIPTION

In order to make the purpose, technical solution and advantages of the disclosure clearer, the disclosure is further described in detail in combination with the accompanying drawings and examples. It should be understood that the specific examples described here are only used to explain the disclosure and are not used to limit the disclosure.

As shown in FIG. 1, a low-carbon nitrogen and phosphorus removal system for sewage treatment, including a primary sedimentation fermentation tank 1, a mainstream modified A²O unit 13 and a bypass anammox unit 14;

the mainstream modified A²O nitrogen and phosphorus removal unit 13 includes a pre-anoxic tank 2, an anaerobic tank 3, an anoxic tank 4, an aerobic tank 5 and a secondary sedimentation tank 6;

the water outlet of the primary sedimentation fermentation tank 1 is simultaneously connected with both the inlet end of the pre-anoxic tank 2 and the anaerobic tank 3, the outlet end of the pre-anoxic tank 2 is connected with the inlet end of the anaerobic tank 3, the outlet end of the anaerobic tank 3 is connected with the inlet end of the anoxic tank 4, the outlet end of the anoxic tank 4 is connected with the aerobic tank 5, the outlet end of the aerobic tank 5 is simultaneously connected with both the inlet end of the secondary sedimentation tank 6 and the inlet end of an internal reflux pump 10, the outlet end of the internal reflux pump 10 is connected with the inlet end of the anoxic tank 4, the bottom sludge outlet of the secondary sedimentation tank 6 is simultaneously connected with the inlet end of both a first sludge reflux pump 11 and a second sludge reflux pump 12, the outlet end of the first sludge reflux pump 11 is connected with the inlet end of the anoxic tank 4, and the outlet end of the second sludge reflux pump 12 is connected with the inlet end of the pre-anoxic tank 2;

the bypass anammox unit 14 includes a carbon source separation sedimentation tank 7 and an anammox tank 8, the inlet end of the carbon source separation sedimentation tank 7 is connected with the outlet end of a water inlet pump 9, the outlet end of the carbon source separation sedimentation tank 7 is connected with the inlet end of the anammox tank 8, the outlet end of the anammox tank 8 is connected with the inlet end of the anoxic tank 4, the bottom sludge outlet of the carbon source separation sedimentation tank 7 is connected with the inlet end of the anoxic tank 4, and the inlet end of the water inlet pump 9 is connected with the outlet end of the anaerobic tank 3.

Particularly, the anoxic tank 4 includes a denitrification phosphorus removal zone 4a and a denitrification nitrogen removal zone 4b, the inlet end of the denitrification phosphorus removal zone 4a is simultaneously connected with the outlet end of the anaerobic tank 3, the bottom sludge outlet of the carbon source separation sedimentation tank 7, the outlet end of the anammox tank 8, the outlet end of the internal reflux pump 10 and the outlet end of the first sludge reflux pump 11, the outlet end of the denitrification phosphorus removal zone 4a is connected with the inlet end of the denitrification nitrogen removal zone 4b, and the outlet end of the denitrification nitrogen removal zone 4b is connected with the inlet end of the aerobic tank 5.

The aerobic tank 5 includes an aerobic zone 5a and a deoxygenation zone 5b, the inlet end of the aerobic zone 5a is connected with the outlet end of the denitrification nitrogen removal zone 4b, the outlet end of the aerobic zone 5a is simultaneously connected with the inlet end of the deoxygenation zone 5b and the secondary sedimentation tank 6, and the outlet end of the deoxygenation zone 5b is connected with the inlet end of the internal reflux pump 10.

Example 2

A low-carbon nitrogen and phosphorus removal process for sewage treatment, and the process includes the following steps:

Step S1: The pretreated domestic sewage entered the primary sedimentation fermentation tank 1 for primary sedimentation and fermentation to provide carbon source, the inorganic components of suspended solids in sewage were removed, and the organic components was hydrolyzed while stripping from the outer layer of suspended particles to provide carbon source for subsequent nitrogen and phosphorus removal; and the solid retention time in the primary sedimentation fermentation tank 1 was 1-5 d, and the hydraulic retention time was 0.5-1.0 h; and the surface loading was 2.0-2.5 m³/(m²·h), the sludge blanket height in the primary sedimentation fermentation tank 1 was 60%-80% of the effective water depth, and the stirring power did not exceed 0.5 W/m³.

Step S2: One part of the effluent (0-30% of total water inlet amount) of the primary sedimentation fermentation tank 1 and one part of the reflux sludge (25-50% of total water inlet amount) of the secondary sedimentation tank 6 entered the pre-anoxic tank 2 for denitrification; and the nitrate in the reflux sludge was removed by denitrification to eliminate its adverse effect on the subsequent phosphorus release process in the anaerobic tank.

Step S3: The other part of the effluent of (70-100% of total water inlet amount) the primary sedimentation fermentation tank 1 and the effluent of the pre-anoxic tank 2 entered the anaerobic tank 3 for biological phosphorus release.

In the process of biological phosphorus release, dissolved organic matter was converted into VFA (volatile organic acid) by the fermentation of facultative bacteria, and then absorbed into the cells by polyphosphate accumulating bacteria to assimilate and synthesize intracellular carbon source storage PHB (poly-β-hydroxybutyrate).

Step S4: One part of the effluent (0-50% of total water inlet amount) of the anaerobic tank 3 entered the carbon source separation sedimentation tank 7 for sludge water separation; and the hydraulic retention time in the carbon source separation sedimentation tank 7 was 1-2 h.

Step S5: The supernatant of the carbon source separation sedimentation tank 7 had a very low content of dissolved organic matter and entered the anammox tank 8 to complete autotrophic nitrogen removal; and the anammox tank 8 was an integrated anammox system, which completes the nitritation and anammox processes in the same tank.

The hydraulic retention time in the anammox tank 8 was 2-6 h, when the activated sludge process was used, the solid retention time was 4-6 d, and the DO was 0.5 mg/L or less, when the pure membrane MBBR process was used, the filler filling ratio was 30%-50%, and the DO was 0.5-2.5 mg/L.

Step S6: The sludge discharged from the bottom of the carbon source separation sedimentation tank 7, the internal reflux liquid from the internal reflux pump 10, the reflux sludge from the first sludge reflux pump 11, the effluent of the anammox tank 8 and the other part of the effluent (0-50% of total water inlet amount) of the anaerobic tank 3 simultaneously entered the denitrification phosphorus removal zone 4a of the anoxic tank 4 for denitrification phosphorus absorption.

The sludge discharged from the bottom of carbon source separation sedimentation tank 7 was rich in PHB, in the anoxic stage, denitrification polyphosphate accumulating bacteria used $NO_3^-$ in the internal reflux liquid as an electron acceptor to oxidize PHB, the dissolved phosphate in the effluent of anammox tank 8 and the other part of effluent of the anaerobic tank 3 were excessively absorbed, and $NO_3^-$ was reduced to nitrogen at the same time.

Step S7: The effluent of the denitrification phosphorus removal zone 4a successively entered the denitrification nitrogen removal zone 4b of the anoxic tank 4 and the aerobic zone 5a of the aerobic tank 5 to complete denitrification, aerobic phosphorus absorption and nitrification.

Step S8: One part of the effluent (10-30% of total water inlet amount) of the aerobic zone 5a entered the deoxygenation zone 5b of the aerobic tank to remove DO in the internal reflux liquid, which had an impact on denitrification in the anoxic zone, and the effluent from the aerobic tank's anaerobic zone 5b entered the denitrification phosphorus removal zone 4a via the internal reflux pump 10.

The hydraulic retention time in the deoxygenation zone 5b was 0.5-1.0 h, with a stirrer or propeller inside, and the terminal DO was controlled 0.5 mg/L or less.

Step S9: After the other part of the effluent (70-90% of total water inlet amount) of the aerobic zone 5a entered the secondary sedimentation tank 6 to complete the sludge water separation, the clear liquid was discharged from the outlet end of the secondary sedimentation tank 6.

Step S10: One part of the bottom sludge (25-50% of total water inlet amount) of the secondary sedimentation tank 6 entered the denitrification phosphorus removal zone 4a through the first sludge reflux pump 11, and the other part (25-50% of total water inlet amount) of the bottom sludge of the secondary sedimentation tank entered the pre-anoxic tank 2 through the second sludge reflux pump 12.

Finally, it should be explained that the above detailed descriptions are only for purposes of illustration of the technical solution of the disclosure and are not intended to be limiting. Although the disclosure is described in detail with reference to examples, those ordinary skilled in the art should understand that the technical solution of the disclosure can be modified or equivalently replaced, without departing from the spirit and scope of the technical solution of the disclosure, which should be covered in the claim scope of the disclosure.

What is claimed is:

1. A carbon, nitrogen and phosphorus removal system for sewage treatment, comprising a primary sedimentation fermentation tank (1), a mainstream modified $A^2O$ unit (13) and a bypass anammox unit (14), wherein
the mainstream modified $A^2O$ unit (13) comprises a pre-anoxic tank (2), an anaerobic tank (3), an anoxic tank (4), an aerobic tank (5) and a secondary sedimentation tank (6);
a water outlet of the primary sedimentation fermentation tank (1) is simultaneously connected with both an inlet end of the pre-anoxic tank (2) and the anaerobic tank (3), an outlet end of the pre-anoxic tank (2) is connected with an inlet end of the anaerobic tank (3), an outlet end of the anaerobic tank (3) is connected with an inlet end of the anoxic tank (4), an outlet end of the anoxic tank (4) is connected with the aerobic tank (5), an outlet end of the aerobic tank (5) is simultaneously connected with both an inlet end of the secondary sedimentation tank (6) and an inlet end of an internal reflux pump (10), an outlet end of the internal reflux pump (10) is connected with the inlet end of the anoxic tank (4), a bottom sludge outlet of the secondary sedimentation tank (6) is simultaneously connected with an inlet end of a first sludge reflux pump (11) and an inlet end of a second sludge reflux pump (12), an outlet end of the first sludge reflux pump (11) is connected with an inlet end of the anoxic tank (4), and the outlet end of the second sludge reflux pump (12) is connected with the inlet end of the pre-anoxic tank (2);
the bypass anammox unit (14) comprises a carbon source separation sedimentation tank (7) and an anammox tank (8), the inlet end of the carbon source separation sedimentation tank (7) is connected with an outlet end of a water inlet pump (9), the outlet end of the carbon source separation sedimentation tank (7) is connected with an inlet end of the anammox tank (8), an outlet end of the anammox tank (8) is connected with the inlet end of the anoxic tank (4), a bottom sludge outlet of the carbon source separation sedimentation tank (7) is connected with the inlet end of the anoxic tank (4), and an inlet end of the water inlet pump (9) is connected with the outlet end of the anaerobic tank (3);
the anoxic tank (4) comprises a denitrification phosphorus removal zone (4a) and a denitrification nitrogen removal zone (4b), an inlet end of the denitrification phosphorus removal zone (4a) is simultaneously connected with the outlet end of the anaerobic tank (3), the bottom sludge outlet of the carbon source separation sedimentation tank (7), the outlet end of the anammox tank (8), the outlet end of the internal reflux pump (10) and the outlet end of the first sludge reflux pump (11), an outlet end of the denitrification phosphorus removal zone (4a) is connected with the inlet end of the denitrification nitrogen removal zone (4b), and an outlet end of the denitrification nitrogen removal zone (4b) is connected with an inlet end of the aerobic tank (5);
the aerobic tank (5) comprises an aerobic zone (5a) and a deoxygenation zone (5b), an inlet end of the aerobic zone (5a) is connected with the outlet end of the denitrification nitrogen removal zone (4b), an outlet end of the aerobic zone (5a) is simultaneously connected with an inlet end of the deoxygenation zone (5b) and the secondary sedimentation tank (6), and an outlet end of the deoxygenation zone (5b) is connected with the inlet end of the internal reflux pump (10).

2. A carbon, nitrogen and phosphorus removal process for sewage treatment, using the nitrogen and phosphorus removal system according to claim 1, wherein the process comprises the following steps:

step S1: making a pretreated domestic sewage enter the primary sedimentation fermentation tank (1) for primary sedimentation and fermentation to provide carbon source for subsequent nitrogen and phosphorus removal;

step S2: making one part of an effluent of the primary sedimentation fermentation tank (1) and one part of a reflux sludge of the secondary sedimentation tank (6) enter the pre-anoxic tank (2) for denitrification;

step S3: making another part of the effluent of the primary sedimentation fermentation tank (1) and an effluent of the pre-anoxic tank (2) enter the anaerobic tank (3) for biological phosphorus release;

step S4: making one part of an effluent of the anaerobic tank (3) enter the carbon source separation sedimentation tank (7) for sludge water separation;

step S5: making a supernatant of the carbon source separation sedimentation tank (7) enter the anammox tank (8) to complete an autotrophic nitrogen removal;

step S6: making a sludge discharged from a bottom of the carbon source separation sedimentation tank (7), an internal reflux liquid from the internal reflux pump (10), a reflux sludge from the first sludge reflux pump (11), an effluent of the anammox tank (8) and another part of the effluent of the anaerobic tank (3) simultaneously enter the denitrification phosphorus removal zone (4a) of the anoxic tank (4) for denitrification phosphorus absorption;

step S7: making an effluent of the denitrification phosphorus removal zone (4a) successively enter the denitrification nitrogen removal zone (4b) of the anoxic tank (4) and the aerobic zone (5a) of the aerobic tank (5) to complete denitrification, aerobic phosphorus absorption and nitrification;

step S8: making one part of an effluent of the aerobic zone (5a) enter the deoxygenation zone (5b) of the aerobic tank (5), and making an effluent of the deoxygenation zone (5b) enter the denitrification phosphorus removal zone (4a) through the internal reflux pump (10);

step S9: after making another part of the effluent of the aerobic zone (5a) enter the secondary sedimentation tank (6) to complete a sludge water separation, discharging a clear liquid from the outlet end of the secondary sedimentation tank (6); and step S10: making one part of a bottom sludge of the secondary sedimentation tank (6) enter the denitrification phosphorus removal zone (4a) through the first sludge reflux pump (11), and making another part of the bottom sludge of the secondary sedimentation tank enter the pre-anoxic tank (2) through the second sludge reflux pump (12).

3. The carbon, nitrogen and phosphorus removal process for sewage treatment according to claim 2, wherein a solid retention time in the primary sedimentation fermentation tank (1) is 1-5 days, and a hydraulic retention time is 0.5-1.0 hour; the surface loading is 2.0-2.5 m$^3$/(m$^2$·h), a sludge blanket height in the primary sedimentation fermentation tank (1) is 60%-80% of an effective water depth, and a stirring power does not exceed 0.5 W/m$^3$.

4. The carbon, nitrogen and phosphorus removal process for sewage treatment according to claim 2, wherein a hydraulic retention time in the carbon source separation sedimentation tank (7) is 1-2 hours.

5. The carbon, nitrogen and phosphorus removal process for sewage treatment according to claim 2, wherein a hydraulic retention time in the deoxygenation zone (5b) is 0.5-1.0 hour, with a stirrer or propeller inside, and a terminal dissolved oxygen (DO) is controlled at 0.5 mg/L or less.

6. The carbon, nitrogen and phosphorus removal process for sewage treatment according to claim 2, wherein the anammox tank (8) is an integrated anammox system, which completes nitritation and anammox processes in the same tank.

7. The carbon, nitrogen and phosphorus removal process for sewage treatment according to claim 2, wherein a hydraulic retention time in the anammox tank (8) is 2-6 hours, when an activated sludge process is used, a solid retention time is 4-6 days, and an dissolved oxygen (DOI is 0.5 mg/L or less, when a pure membrane moving bed biofilm reactor (MBBR) process is used, a filler filling ratio is 30%-50%, and the DO is 0.5-2.5 mg/L.

\* \* \* \* \*